United States Patent
Verheyde et al.

(10) Patent No.: US 12,202,201 B2
(45) Date of Patent: Jan. 21, 2025

(54) SYSTEM AND METHOD FOR MANUFACTURING THREE-DIMENSIONAL STRUCTURES

(71) Applicant: VITO NV, Mol (BE)

(72) Inventors: Bert Verheyde, Mol (BE); Jasper Lefevere, Mol (BE); Bart Michielsen, Mol (BE); Dirk Vangeneugden, Mol (BE)

(73) Assignee: VITO NV, Mol (BE)

( * ) Notice: Subject to any disclaimer, the term of this patent is extended or adjusted under 35 U.S.C. 154(b) by 365 days.

(21) Appl. No.: 17/794,148

(22) PCT Filed: Jan. 20, 2021

(86) PCT No.: PCT/EP2021/051181
§ 371 (c)(1),
(2) Date: Jul. 20, 2022

(87) PCT Pub. No.: WO2021/148458
PCT Pub. Date: Jul. 29, 2021

(65) Prior Publication Data
US 2023/0050867 A1      Feb. 16, 2023

(30) Foreign Application Priority Data
Jan. 20, 2020   (EP) ..................... 20152699

(51) Int. Cl.
*B33Y 30/00*        (2015.01)
*B22F 1/107*        (2022.01)
(Continued)

(52) U.S. Cl.
CPC ............ *B29C 64/379* (2017.08); *B22F 1/107* (2022.01); *B29C 64/118* (2017.08);
(Continued)

(58) Field of Classification Search
None
See application file for complete search history.

(56) References Cited

U.S. PATENT DOCUMENTS

| | | |
|---|---|---|
| 10,471,697 B2 | 11/2019 | Sieradzki et al. |
| 2007/0075460 A1 | 4/2007 | Wahlstrom et al. |
| | (Continued) | |

FOREIGN PATENT DOCUMENTS

| | | |
|---|---|---|
| CA | 2958945 A1 | 3/2016 |
| CN | 107 877 863 A * | 4/2018 |
| | (Continued) | |

OTHER PUBLICATIONS

International Search Report and Written Opinion—PCT/EP2021/051181—mailing date Jul. 29, 2021.

*Primary Examiner* — Mohammad M Ameen
(74) *Attorney, Agent, or Firm* — Banner & Witcoff, Ltd.

(57) ABSTRACT

A system and method for manufacturing three-dimensional structures is provided. The system includes plurality of printing stations and a robotic unit configured to interact with the plurality of printing stations, each of the plurality of printing stations being arranged to be accessible by the robotic unit. Each printing station includes a station controller for controlling at least one deposition control parameter. The system further includes a system controller configured to operate the robotic unit, and wherein the system controller is communicatively coupled to the plurality of printing stations for controlling at least an execution of printing tasks being performed on the plurality of printing stations. The station controllers are at least partially controllable by means of the system controller, wherein the system controller is configured to adjust at least one deposition control parameter of each printing station independent (Continued)

of deposition control parameters of other printing stations of the plurality of printing stations.

16 Claims, 7 Drawing Sheets

(51) Int. Cl.
    *B29C 64/118*     (2017.01)
    *B29C 64/379*     (2017.01)
    *B29C 64/393*     (2017.01)
    *B33Y 10/00*     (2015.01)
    *B33Y 50/02*     (2015.01)

(52) U.S. Cl.
    CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2014/0363532 A1 | 12/2014 | Wolfgram |
| 2017/0326803 A1 | 11/2017 | Chanclon et al. |
| 2019/0255733 A1* | 8/2019 | Höchsmann ............ B22F 12/84 |

FOREIGN PATENT DOCUMENTS

| | | |
|---|---|---|
| CN | 108 162 387 A * | 6/2018 |
| DE | 102016112472 A1 | 1/2018 |
| RO | 132300 | 12/2017 |
| WO | 2015073301 A1 | 5/2015 |
| WO | 2018172092 A1 | 9/2018 |
| WO | 2018203752 A1 | 11/2018 |

* cited by examiner

SYSTEM AND METHOD FOR MANUFACTURING THREE-DIMENSIONAL STRUCTURES

CROSS-REFERENCE TO RELATED APPLICATIONS

This application is a U.S. National Stage application under 35 U.S.C. § 371 of International Application PCT/EP2021/051181 (published as WO 2021/148458 A1), filed Jan. 20, 2021 which claims the benefit of priority to Application EP 20152699.3, filed Jan. 20, 2020. Benefit of the filing date of these prior applications is hereby claimed. Each of these prior applications is hereby incorporated by reference in its entirety.

FIELD OF THE INVENTION

The invention relates to a system and method for manufacturing three-dimensional structures by filament deposition of build material paste.

BACKGROUND TO THE INVENTION

Additive manufacturing is currently widely used and various techniques exist. Additive manufacturing is a suitable technique for building a structure layer-by-layer and the manufactured structure can be employed in various applications.

Extrusion-based additive manufacturing methods have been employed for fabrication of three-dimensional structures. A material (e.g. a viscous paste, a meltable polymer, a hydrogel, etc.) is extruded through a nozzle in the form of filaments. A certain arrangement of filaments can be obtained by relative movement of the nozzle with respect to a print bed during deposition. During the material extrusion, filaments are extruded from a nozzle and positioned relative to one another according to a predetermined pattern providing the desired properties of the manufactured three-dimensional structure. The lay-down pattern is determined by the print path and has major impact on the shape and properties of the printed structure. The extrusion-based techniques can be used for printing three-dimensional structures. In this way, three dimensional structures with complex geometries and porous structures with a fully interconnected network of internal pores which are accessible from the outside can be obtained, which may be required for some applications.

The existing systems and methods can be rather slow and inefficient to implement for mass production of three-dimensional structures. There is a need for improving the printing process of three-dimensional structures manufactured by an extrusion based printing process. Often, the printing process is rather slow, making it difficult to employ for printing various objects requiring a higher output while avoiding high costs involved. It is desired to obtain a system capable of increasing the output of printed 3D structures in an efficient manner.

SUMMARY OF THE INVENTION

It is an object of the invention to provide for a method and a system that obviates at least one of the above mentioned drawbacks.

Additionally or alternatively, it is an object of the invention to improve the additive manufacturing process for three-dimensional structures.

Additionally or alternatively, it is an object of the invention to improve the efficiency of an extrusion based additive manufacturing process for fabricating three-dimensional structures.

Thereto, the invention provides for a system for manufacturing three-dimensional structures, the system comprising a plurality of printing stations and a robotic unit configured to interact with the plurality of printing stations, each of the plurality of printing stations being arranged to be accessible by the robotic unit, and wherein each printing station comprises a detachable carrier, a deposition unit with at least one nozzle arranged for dispensing filaments of a build material paste through an opening area thereof, and a station controller configured to operate the deposition unit for deposition of filaments of the build material paste on the detachable carrier in an interconnected arrangement in a plurality of stacked layers in order to form one or more three-dimensional structures, the at least one nozzle and the detachable carrier being relatively moveable with respect to each other, wherein the station controller of each of the printing stations is configured to control at least one deposition control parameter, wherein the robotic unit includes a handling device for handling detachable carriers, wherein the robotic unit is configured for providing, removing and/or replacing detachable carriers in the plurality of printing stations, and wherein the system further includes a system controller configured to operate the robotic unit, and wherein the system controller is communicatively coupled to the plurality of printing stations for controlling at least an execution of printing tasks being performed on the plurality of printing stations.

The system of the present invention has a double layered control configuration, wherein local control performed by the station controller is in communication with the system controller for providing an efficient production of the three-dimensional structures being printed by the printer. This provides various advantages in letting the plurality of printing stations efficiently operate in order to print three-dimensional structures. For example, subtasks of a large printing campaign can be better handled as the printing stations of the system are better aligned with each other.

The system can enable an additive manufacturing process for three-dimensional structures with an improved efficiency and versatility. Multiple three-dimensional structures can be printed at least partially simultaneously using the multiple printing stations. Moreover, also the printing quality provided by the plurality of individual controllers can be significantly enhanced per printing station. For instance, a better control over the filaments interspacing or filament-to-filament distance can be obtained for each printing station. The system can have a number of integrated functionalities.

The system may guarantee an improved continuity in the printing operations of the plurality of printing stations. The printing stations can continue to work while adjustments are performed to one or more printing stations, e.g. when replacing or refilling a build material paste reservoir, adjusting control parameters of a printing station, etc. Additionally or alternatively, operations of individual printing stations can be halted while the other printing stations continue actively printing.

The system controller can be configured to control the robotic unit and its interaction with different printing stations of the system. For example, when a printing station is ready printing the robotic unit can remove the carrier and/or the three-dimensional printed structures, and provide a new carrier for a next printing task. Furthermore, the system controller can be arranged to control when the printing stations are to start the printing process, perform actions when the reservoirs containing the build material are (almost) empty, etc. The station controller can be configured to control the local printing stations.

The system can enable improved parallel printing at the plurality of printing stations. The printing operations can be better tuned/adapted to each other, provided by the individual control of the printing stations and/or the arrangement of the build material reservoirs. Or else printing tasks carried out by individual printing stations can be individually controlled, e.g. in relation to the nature of the material, the three-dimensional arrangement of the filaments, the rate with which extrusion of the build material is carried out etc.

The robotic unit can be configured to determine a destination for the carrier carrying printed three-dimensional structures removed from the printing station. In some examples, the robotic unit may return the carrier to its original position in the empty state, e.g. on a rack or collection system. According to other examples the robotic unit does not necessarily have to be put back the carrier on the same destination (e.g. same rack of a collection system), but may take care to transport the carrier towards a post-processing unit. This can, for example, depend on the optional post processing steps for the printed three-dimensional structures.

In the system of this invention several printing stations or printers may be integrated, The printing stations or printers may be the same or different. In particular, several printing stations or printers may be provided for extruding a build material from one or more extrusion nozzles, so-called extrusion or micro-extrusion printing. The system further includes an automatic robotic unit for applying, removing and/or replacing carriers (e.g. plate, tray or substrate) in the printing stations.

The system may have one or more housings. In some examples, the system has a system housing enclosing the plurality of printing stations. In some examples, each printing station has its own housing enclosing at least the carrier and the deposition unit. A combination of individual printing station housings and a system housing may be suitable as well. The housing may be fluid sealed enabling working with toxic or hazardous chemicals for which for instance gas extraction is required or where printing in a certain environment, i.e. inert or oxidizing gas, is required.

Multiple printing stations can be placed in the system housing. Each printing station can have one or more deposition units with one or more nozzles or printheads. Build material paste (e.g. viscous paste) can be fed to each nozzle or printhead of the deposition or extrusion unit of the printing station from one or more removable build material paste reservoirs. The build material paste reservoirs may be arranged within the system housing, they may also be arranged externally with respect to the system housing. The reservoirs can be removably arranged by means of quick couplings (enabling a quick and easy installation, removal and/or replacement of the reservoirs).

Optionally, the system is arranged such that each printing unit is individually accessible through the individual housing and/or the system housing by means of an opening (e.g. an access panel, door or window). In this way, devices of a printing station can be accessed for instance by an operator (e.g. print nozzle replacement, resolving nozzle clogging, removal of parts that went wrong with printing, etc.) without the printing operations being carried out in the other stations being influenced by this. Furthermore, devices of a printing station may be accessed without affecting the supply and removal of carriers (e.g. trays) for the other printing stations.

Optionally, a desired atmosphere is maintained in the system housing. Such a controlled atmosphere can also be obtained in optional individual housings of the printing stations. In some alternative examples, an open system is provided. Such an open system may for instance have a cage surrounding working areas (e.g. for operator safety purposes). The atmosphere can be regulated in its entirety (e.g. within the system enclosure), or per print station (e.g. within each printing station individually).

Each printing station can have one or more access openings. The system may be configured such that when an access panel of an individual printing station is opened, operation of the individual printing station is paused, halted or stopped. The robotic unit may automatically stop when the door opens. The system may be configured such that when an access panel of an individual printing station is opened, the printing operation at the other printing stations is continued unmodified or is adapted.

Printing of the filaments can be done on carriers formed by printing plates or printing tables or printing containers. The plates can be placed or positioned in the printing station, using a positioning structure.

A collecting system may be provided for holding and/or collecting the carriers being removed from the printing stations and/or transporting the carriers to a collecting station or a further processing station for the printed three dimensional structures. The collecting system may also be provided to store empty carriers to have them ready for exchange and transport to a printing station when a filled carrier is positioned in the collecting system. In some examples, the collecting system includes one or more racks with slots in which the carriers can be placed by the robotic unit. The robotic unit can be configured to unload empty carriers in the printing stations and loading carriers with the one or more three-dimensional structures printed thereon in the collecting system (e.g. in a rack of the collecting system).

It is to be understood that the at least one nozzle of the deposition head and the carrier in the printing station can be moved relative to each other, at least in X- or Y-direction, and in Z-direction to permit building a three dimensional object. In some examples the at least one nozzle of the deposition head may be moved with respect to the carrier, and the position of the carrier remains fixed in the course of a printing operation to minimize the risk to damaging of freshly printed structures.

The deposition head (cf. nozzle head) may include a body on which the plurality of nozzles is arranged. Many variants are possible. It is also possible that a frame is used holding the plurality of nozzles. The nozzles may be separate units or may be integrated within a body of the nozzle head, for instance formed by a plurality of openings in a wall of the body of the nozzle head. According to a different embodiment, the nozzles may be mounted on a frame which extends either in one, two or three dimensions.

Optionally, the plurality of nozzles are moved together by means of moving the deposition head. Additionally or alternatively, the plurality of nozzles may be independently moveable with respect to each other. In an example, the nozzles are connected to the deposition head, and the relative movement between the plurality of nozzles and the carrier is achieved by moving the deposition head resulting in the multiple nozzles being moved together by the corresponding movement of the deposition head.

A build material (e.g. paste, suspension, etc.) can be extruded through the multiple nozzles of the deposition head for three-dimensional filament deposition. The deposited filaments can form a layered network. The layers may for instance be successively printed on top of each other, resulting in a structure formed by a stack of successive layers. The filaments can be spaced apart with respect to each other, according to the spacing of the nozzles, in order to define channels therebetween. By varying the filament orientation in subsequent layers a porous three-dimensional structure can thus be obtained in this way. The filaments can however also be positioned adjacent to each other, The filament orientation in subsequent layers may be the same or different.

Advantageously, the productivity of 3D-extrusion can be significantly increased by increasing the amount of nozzles and/or printing stations employed in the system, instead of employing a single nozzle and/or single printing station which is fed by a material (e.g. paste) reservoir.

The layerwise deposition of the filaments may include extruding a material through a (deposition) nozzle to form the filaments while moving the deposition nozzle and the support or print bed relative to each other. The nozzle can be moved with respect to the carrier/support of the printing station, and/or vice versa. Hence, it will be appreciated that kinematic inversions are also envisaged.

Different types of porous structures can be obtained. Porous structures obtainable with the method of this invention may represent a mesh, a lattice structure, a filament network, a scaffold, a filament framework, or the like. Structures not containing macro-pores between the filaments, so-called massive or full structures, may be obtained as well. Many types of arrangements and structures are possible, for porous and full structures. The specific arrangement of the filaments defining the structure of the three-dimensional structure may be selected based on the application.

Furthermore a larger number of porous or non-porous structures or three-dimensional objects can be manufactured in a single printing campaign carried out by the system, such that the efficiency can be improved. The system is particularly efficient in handling large printing campaigns involving the production of a relatively large number of three-dimensional structures.

Optionally, the system controller is communicatively coupled to the station controllers of the plurality of printing stations.

The communication can be a software communication, a physical communication and/or a wireless communication. Various embodiments are envisaged. In some examples, the system controller and station controller are arranged in different hardware components. However, the station and system controllers may also be implemented in a same hardware component in some examples. The controllers may for instance be implemented in a computer program product.

In some examples, all printing stations are accessible by the robotic unit. For this purpose the robotic unit can be at least partially surrounded by the printing stations (e.g. arranged centrally). The robotic unit can be arranged to install and place empty carriers in printing stations, and to remove the carriers with three-dimensional structures printed thereon from the printing stations. The carriers with three-dimensional structures printed thereon can be removed from the printing station and placed on a cart or any other collecting and/or transport device for removal. A positioning structure may be arranged to enable correct positioning of the carrier in the collection system (e.g. cart, rack, etc.). If the handling by the robotic unit is not performed correctly, for instance due to bad positioning, the edge of the cart may be bumped unintentionally, which can disrupt the three-dimensional structures on previously placed carriers.

If printing of the three-dimensional structures on the carrier has been completed (e.g. print job completed or carrier/plate being full), the robotic unit can be operated to automatically remove the carrier with the printed three-dimensional structures and to place it in a receiving unit, such as a cart or holder e.g. for transportation. Each printing station can be controlled individually. In some examples, different materials can be printed per printing station. Furthermore, it is possible to print different shapes per printing station, or structures having different dimensions or different geometries. Also different quantities can be printed per printing station. The system can be configured to determine whether a correct number of three-dimension structures is printed on the carrier and then the carrier with printed three-dimensional structures (e.g. objects, parts, pieces, etc.) can be removed by the robot unit when the print job has been completed.

The system can be configured to control the robot unit taking into account printing operations in the plurality of the printing stations. The (sub)tasks for printing the three-dimensional structure(s) can be sent individually or directly to the printing station being selected for performing the printing of said three-dimensional structure(s). The system can be configured to enable an individual control for each printing station. This can be adjusted separately by an operator, if necessary, for example by means of a terminal. The individual control for the printing stations can for instance be arranged on an outside portion of the printing station or the system (e.g. outside the printer housing and/or system housing). In some examples, each printing station has an external terminal or interface for enabling individual control over the printing station. The printing process can therefore be easily adjusted for each of the printing stations.

Optionally, the at least one deposition control parameter of each printing station is adjustable independent of deposition control parameters of other printing stations of the plurality of printing stations.

In some examples, the system includes a central process control for controlling the handling of the carriers of the plurality of printing stations, and for providing starting signals to the printing stations for starting a print job. The printing station can then indicate when the carrier is full or when a printing (sub)task has been completed. Then, the robotic unit can be operated to collect the carrier with the printed three-dimensional structures printed thereon. In some examples, the robotic unit can be configured to place a new carrier in the printing station after a previous one has been removed. The robotic unit can then give a start signal to the printing station, and the printing station can be operated to start printing again with the next printing (sub) task.

The individual control provided for each of the printing stations makes it possible to tweak/adapt for minor printing deviations, for example by an operator or automatically by means of a computer implemented routine. It is possible to better finetune the printing conditions of the plurality of printing stations with respect to each other.

For example, the paste employed in the different printing stations of the system can have slightly different viscosity. It is possible to compensate for such deviations by individual control of the printing stations of the system. In some examples, each printing station can be controlled individually, also from the outside of the confined environment (e.g. housing) of the system or the printing stations. In some examples, all individual printing stations can be placed in a confined environment of the system (cf. system housing). This can make it possible to work with toxic materials in a safe environment.

Optionally, the at least one deposition control parameter is individually adjustable for each nozzle of the at least one nozzle of each printing station.

The system can adapt the printing conditions for each of the nozzles, which permits to adjust the printing conditions to the nature of the build material and the nature of the three-dimensional structure to be printed and may result in a more homogenous production of three-dimensional structures.

Optionally, operations of the plurality of printing stations are independently controllable with respect to each other. Optionally, operations carried out by each of the plurality of printing stations are independently controllable.

In some examples, the control of one printing station may not influence the control of another printing station. However, both printing stations may be at least partially controllable by means of the system controller which is configured to communicate with the station controllers of the printing stations.

Optionally, a housing is arranged to enclose at least the deposition unit and the detachable carrier of each printing station. The housing may be arranged as an overall housing of the system in which the printing stations and if so desired empty carriers, the carrier collecting system and the robotic unit are positioned. However, in some embodiments, additionally or alternatively, each printing station may have its own housing. The housing may be arranged to define a confined area in which contact with robotic movement and/or (operator) exposure to substances released during printing can be substantially prevented or reduced. The housing therefore may include an extraction unit or exhaust unit for contaminated air or gas and means for replacement by non-contaminated air or gas. The extraction or exhaust unit may further comprise exhaust gas cleaning.

Optionally, the at least one deposition control parameter for each of the plurality of printing stations is adjustable by means of a respective terminal. Optionally, the terminal is connected to the housing of the respective printing station. In some examples, the terminal is arranged outside the housing of each of the printing stations. In another example, the terminal is arranged outside of the system housing.

Optionally, the at least one deposition control parameter for each of the plurality of printing stations is adjustable by means of a central terminal or system controller. The central terminal or system controller may be arranged near the system, for example attached to the housing. However, it is also possible that the central terminal or system controller is located at a remote location. Furthermore, it is also envisaged that the central terminal or system controller is accessible via remote connection software or the like (cf. remote desktop).

Optionally, each printing station includes a detection unit configured to detect when a detachable carrier is to be provided, removed and/or replaced, wherein information of the detection unit is communicated to the system controller.

The system controller may interact with the plurality of printing stations in order to efficiently handle the manufactured three-dimensional structures printed by said plurality of printing stations.

Optionally, the at least one deposition control parameter includes at least one of: an actuation force or pressure exerted to the build material for achieving deposition thereof through an extrusion nozzle, a printing speed during relative movement between the deposition unit and the carrier during deposition of the filaments, a size of the opening area through which build material is discharged, or a temperature to which the build material is heated or cooled for deposition.

Optionally, the nozzle head includes a plurality of nozzles for depositing filaments, the plurality of nozzles being spaced apart from each other.

The multiple nozzle arrangement provides an additive manufacturing process for three-dimensional structures with an improved efficiency, as multiple filaments can be printed simultaneously using the multiple nozzles. Moreover, also the printing quality can be significantly enhanced. For instance, a better control over the filaments interspacing or filament-to-filament distance can be obtained when compared to a single nozzle process.

The nozzle head may include a body on which the plurality of nozzles are arranged. Many variants are possible. It is also possible that a frame is used holding the plurality of nozzles. The nozzles may be separate units or may be integrated within a body of the nozzle head, for instance formed by a plurality of openings in a wall of the body of the nozzle head. According to a different embodiment, the nozzles may be mounted on a frame which extends either in one, two or three dimensions.

Optionally, the plurality of nozzles are moved together by means of moving the nozzle head. Additionally or alternatively, the plurality of nozzles may be independently moveable with respect to each other. In an example, the nozzles are connected to the nozzle head, and the relative movement between the plurality of nozzles and the support is achieved by moving the nozzle head resulting in the multiple nozzles being moved together by the corresponding movement of the nozzle head.

The spacing between adjacent nozzles can be selected in order to enhance the structural arrangement of the porous object being manufactured.

The plurality of nozzles may be configured to provide filament deposition paths being arranged in at least one linear array. During deposition, the plurality of deposition paths may be straight next to each other.

Optionally, the deposition unit includes more than two nozzles. In some examples, the deposition unit includes more than four nozzles, even more than six nozzles. By providing a larger number of nozzles (e.g. eight nozzles), the output of printed three-dimensional structures can be increased. Some of the nozzles can also be used for printing with different materials.

Optionally, the system further includes a positioning structure arranged for positioning the carrier within the printing station, wherein the positioning structure includes a first positioning member and a second positioning member, wherein the first positioning member and the second positioning member are arranged to cooperate to realize a positioning function of the carrier within the printing station.

The positioning structure can effectively guarantee that the carrier is correctly positioned in the printing station. As a result, the robotic unit can carry the carrier correctly.

The positioning structure can be arranged to ensure correct positioning of the carrier in the printing station. For instance, when the print job is ready, the robotic unit can transport the carrier away from the printing station (e.g. to a collection system). The robotic unit can more accurately handle and carry the carrier as the positioning structure ensures a more accurate positioning of the carrier inside the printing station. In some examples, sensors are provided to detect how and where the carrier is placed in a printing station. It can be better prevented that the carrier might be picked up by the robotic unit in a non-predetermined ways. Hence, collision with the collection system (e.g. a cart) can be better prevented, without requiring advanced sensory systems. So instead of working purely on sensory data, mechanical positioning means are used that guarantee an improved positioning of the carriers in the printing stations and the robotic handling and carrier collection of the system. However, additionally or alternatively, also sensory systems can be provided for handling and positioning of the carriers. In some examples, a combination of a number of sensors and one or more mechanical positioning structures are provided for enabling accurate positioning of the carriers.

Optionally, the system may also include a further positioning structure arranged for positioning the carrier within the collection system, similar to the positioning structure provided for positioning within the printing station. Such a further positioning structure may include a further first positioning member and a further second positioning member, arranged to cooperate to realize a positioning function of the carrier within the collection system. A positioning member provided on a carrier may be provided to co-operate with a positioning member in the printing station and with a positioning member in the collection system.

Optionally, the detachable carrier of each printing station is movable to a collection system by means of the robotic unit.

In some examples, the robotic unit is configured to deposit the printed three-dimensional structures or the carrier with printed three-dimensional structures pieces on a transport medium (in this case carts), so that they can be guided to a next process step (e.g. three-dimensional porous structures for use as a catalyst can undergo post-processing). It will be appreciated that various transport systems can be used for holding or carrying the carriers or printed three-dimensional structures. Some examples of transport systems are racks, carts, conveyor belt, etc. However, other arrangements are also possible. Optionally, the position of the cart/rack of the collection system within the printing system is fixed.

The positioning structure can enable a more accurate positioning of the carrier in the printing station, resulting in a more controlled removal of carriers with printed structures from the printing station by means of the robotic unit.

One printing station can be operated without the other print stations being affected thereby. Hence, adjustments can be performed in one of the printing stations while the system can still continue to deliver output by means of the other printing stations. For example, if the carrier with printed three-dimensional structures is removed in one station, if the pasta reservoir is replaced at one station, only that station is stopped and the other stations can continue performing printing operations.

In some examples, the carrier includes a locking unit for ensuring that the carriers are positioned correctly within the printing station. The locking unit may for instance include one or more locking pins.

Optionally, the system includes an optical unit configured to check whether the carrier is placed in the printing station. The positioning however, can be performed using mechanical means. The printing station may for instance have a kinematic coupling.

In some examples, printing parameters of one printing station of the system can be changed (tuning, for example flow rate) without affecting operations of the other printing stations.

Optionally, the system includes a plurality of integrated printing stations.

Optionally, the system is arranged to integrate two or more individual printing stations.

Optionally, the system includes a confined environment in which the three-dimensional structures are printed.

Optionally, the system includes several individual printing stations, at least a subset of the printing stations being based on micro extrusion technology. Micro extrusion is understood to comprise extrusion of a build material through an extrusion nozzle in the form of filaments. The build material may be a paste at room temperature. Optionally, viscosity of the build material is adjusted for 3D printing by means of temperature control (e.g. an increased temperature may be employed for lowering the viscosity).

Optionally, the system includes means for providing carriers to be printed on. In some examples, the robotic unit is arranged for enabling the provision of carriers in the printing stations in a desired position, and removal of carriers from the printing stations. The robotic unit can be configured to interact with the plurality of the printing stations of the system. Optionally, the system includes an automated handling system within the confined environment formed by the system, the automated handling system being configured to provide carriers to each of the printing stations and to remove them from the printing stations, for example with three-dimensional structures printed thereon.

Optionally, the system includes a means for collecting carriers with printed three-dimensional structures (e.g. objects) for transport.

Optionally, the system includes a software program product configured to allow optimizing the output of the integrated printing stations.

Optionally, the system includes a confined environment, for example surrounded by a housing.

Optionally, the confined environment includes a physical shielding. This may provide for operator safety.

Optionally, the system includes a ventilation unit configured to ventilate/extract gas from the confined environment.

Optionally, the system includes a conditioning unit configured to condition the medium (e.g. air) inside the confined environment. In some examples, the temperature and/or humidity can be controlled.

Optionally, the system includes means for ventilation/extraction of gas volatile substances which may be released during printing in the printing stations.

Optionally, the system is configured to provide a modified gas atmosphere in at least regions of the confined environment. In this way, one or more of the printing stations are able to operate under a modified gas atmosphere (e.g. inert gas).

Optionally, the system is configured to provide controlled light conditions in the confined environment. One or more of the printing stations may thus be configured to operate under controlled light conditions.

Optionally, each individual printing station is accessible from the outside of the confined environment of the system.

Optionally, the system is configured such that at least one of stopping of printing activities on a specific printing station, or carrier handling activities for the specific printing station, are carried out without requiring the printing activities on other printing stations or automated carried handling by the robotic unit for the other printing stations to be interrupted.

Optionally, the printing stations of the system are configured to receive carriers for 3D printing of three-dimensional structure(s) thereon. The printing stations may include means enabling position the carriers in an automated way.

Optionally, the printing stations of the system are configured to remove carriers with three-dimensional structure(s) printed thereon in an automated way.

Optionally, the plurality of printing stations of the system are identical or different with respect to each other.

Optionally, the printing stations may have one of more printing heads.

Optionally, at least one reservoir providing a supply of build material paste for printing is placed on the outside of the confined environment.

Optionally, at least one reservoir providing a supply of build material paste for printing is exchangeable by means of a fast connection arrangement.

Optionally, the reservoir holding the build material paste is a paste cartridge. The cartridge may have connection means enabling a fast and easy attachment to the printing station or system.

Optionally, the robotic unit may be configured to provide carriers to the printing stations. The robotic unit may be configured to interact with the printing stations in order to arrange a pile or stack of carriers in a carrier holder. Additionally or alternatively, a rack or cart or other carrier collecting device can be provided in which the carriers are placeable. Additionally or alternatively, a conveyor belt may be employed for supplying carriers towards the robotic unit or conveying carriers out of the system. The carriers supplied by the conveyor belt may for instance be emptied, such that they can be placed in the printing stations.

Optionally, the robotic unit may be an automated carrier handling system.

Optionally, the robotic unit includes at least one of an automated (computer controlled) translation and/or rotation systems including robots, sledges, conveyor belts, plungers, rotating disks.

Optionally, the robotic unit may be configured to fix the carriers during automated handling, e.g. by clamping or pin locking.

Optionally, fixation of carriers may be monitored during automated handling.

Optionally, the carrier may be a plate, tray or other object on which printing of three-dimensional structures is performed.

Optionally, the accelerations and vibrations occurring during transport of the carrier is controlled. For example, removing of the carrier with printed three-dimensional structure(s) thereon, may be carried out under controlled accelerations and vibrations of the robotic unit. This may allow transportation of parts with limited physical/vibrational stability.

Optionally, the robotic unit is configured to enable collection of the three-dimensional structures. Optionally, the robotic unit is part of a collection system.

Optionally, the robotic unit is placed inside the confined environment.

Optionally, the collection system includes carts or racks on which several carriers (e.g. trays, plates, substrates) are collectable.

Optionally, the collection system includes a box or container in which three-dimensional printed structures are collectable.

Optionally, the collection system includes a conveyor belt for transporting carriers towards and/or away from the system.

Optionally, each container is removable from the confined environment by unlocking a specific location (cf. collection docking station).

Optionally, each collection unit has a manual or automatic removal mechanism.

Optionally, the system includes a computer program product configured to be run on one or more controllers of the system.

Optionally, the computer program product is configured to control and monitor a supply of empty carriers.

Optionally, the computer program product is configured to control and monitoring a progress of a printing process on each of the individual printers.

Optionally, the computer program product is configured to operate the robotic unit such as to remove a particular carrier from the printing station after termination of the printing job on the printing station for the particular carrier.

Optionally, the computer program product is configured to operate the robotic unit such as to place the carrier and/or the printed three-dimensional structure(s) in a collection system.

Optionally, the computer program product is configured to follow up an overall status of print jobs involving multiple printing stations and multiple carriers.

Optionally, the computer program product is configured to estimate a time to finish a print job.

Optionally, the computer program product is configured to estimate a time for exchange of a material reservoir.

Optionally, the computer program product is configured to indicate when a collection unit is full.

Optionally, the system is arranged for manufacturing three-dimensional structures. The structures may either be porous, meaning that interconnected filaments are positioned at a distance from each other, or they may be non-porous meaning that the filaments are positioned adjacently.

Optionally, the system includes a plurality of printing stations in proximity to each other. In some examples, the plurality of printing stations are positioned next to each other. The printing stations may for example be arranged adjacent each other.

The system can have multiple printing stations in an enclosed environment with changeable print reservoirs outside of the enclosed environment (e.g. outside of the housing). The reservoirs arranged outside of the enclosed environment can be easily replaceable, for example not requiring stopping of a printing process when the reservoir is replaced.

According to an aspect, the invention provides for a method for manufacturing three-dimensional structures, the method including providing a plurality of printing stations and a robotic unit configured to interact with the plurality of printing stations, each of the plurality of printing stations being arranged to be accessible by the robotic unit, and wherein each printing station is provided with a detachable carrier, a deposition unit with at least one nozzle arranged for dispensing filaments of a build material paste through an opening area thereof, a housing arranged to enclose at least the deposition unit and the detachable carrier, and a station controller configured to operate the deposition unit for deposition of filaments of the build material paste on the detachable carrier in an interconnected arrangement in a plurality of stacked layers in order to form one or more three-dimensional structures, the at least one nozzle and the detachable carrier being relatively moveable with respect to each other, wherein the station controller of each of the printing stations is configured to control at least one deposition control parameter, wherein the robotic unit includes a handling device for handling detachable carriers, wherein the robotic unit is configured for providing, removing and/or replacing detachable carriers in the plurality of printing stations, and wherein a system controller is provided configured to operate the robotic unit, and wherein the system controller is communicatively coupled to the plurality of printing stations for controlling at least an execution of printing tasks being performed on the plurality of printing stations.

Optionally, the system has multiple printing stations, wherein each station has one or more print heads for paste filament deposition. The system may include one or more housings providing access to printing rooms of the plurality of printing stations.

Optionally, each printing station is accessible via at least one access panel, door or window or other access member known to the skilled person. Optionally, the system is configured such that opening of a door linked to one or more printing stations automatically stops printing by said one or more printing stations.

Optionally, each printing station is individually controllable. For example, print patterns to be followed, the print speed, the used print paste, the filament diameter, the filament deposition pattern, etc. can be adjusted for each of the printing stations, for example independently from each other for each of the printing stations.

Optionally, one or more build material paste reservoirs (e.g. containers) are arranged outside the housing (printing station housing, or system housing). Optionally, the reservoirs are attached to the outside of the housing by means of quick fits. The reservoirs can be arranged to provide a supply of paste to the print head of the printing station(s). Such a quick fit can facilitate connection, to allow a quick exchange of the reservoirs as soon as they are empty.

Optionally, printing is performed on a removable carrier. The carrier may form a removable table on which the three-dimensional structure is printable.

Optionally, each printing station contains a positioning structure arranged for positioning of the carrier in the printing station. In this way, it can be ensured that the carrier is always placed in a print station in the same way. The robotic unit can take care of moving the carrier to a storage system and/or transport system as soon as the carrier is full or the desired number of three-dimensional structures have been printed thereon or a printing task has been finalized or ended. Optionally, the robotic unit is configured to always takes the carrier from a same position and moves it to the storage system and/or transport system. Optionally, the robotic unit is configured to always take and carry the carrier in a same configuration. As the carrier is more accurately handled by the robotic unit, the carrier may be able to more accurately place it in the storage system and/or transport system.

According to an aspect, the invention provides for a use of the system according to the invention for manufacturing three-dimensional structures.

It will be appreciated that the carrier can be embodied in various ways. The carrier can for instance be embodied as a plate, a tray, a print surface, a support, a substrate, a holder, or the like. In some examples, the carrier provides for a flat surface on which three-dimensional structures are printable. However, the carrier does not need to be flat. Other shapes are also envisaged.

Different types of extrusion additive manufacturing arrangements can be employed, for example filament-fed extrusion, screw extrusion or a syringe extrusion. A combination of these technologies is also possible.

In syringe extruders material can be placed into a syringe and the printer can depress the plunger at a controlled rate to extrude filaments through a nozzle. The syringes may for example be filled with a viscous material. In some examples, additionally a heated jacket can be used for heating the syringe to lower the viscosity of the build material paste or to melt the build material (e.g. polymer filaments or granules) in situ before printing. Different types of syringe extrusion systems are possible. A pneumatic pressure can be applied to the plunger. Alternatively, the plunger can be depressed by means of a mechanical displacement for instance achieved by means of an electric motor. Mechanical displacement may allow for more direct control over the volumetric extrusion rate whereas in pneumatic printers, the extrusion rate may additionally depend on an interplay between needle geometry, material viscosity, pneumatic pressure, and obstruction by previously extruded filaments. Other alternative designs are also possible.

In screw extruders a material can be fed into a screw that is surrounded by a close-fitting sleeve, called a barrel. As the screw rotates, material can be forced through the nozzle at the end of the barrel. The rate of material extrusion from the nozzle can depend on the screw rotation speed. Screw extruders can accommodate materials in paste form, however, for example polymer granules can also be used.

Filament-fed extruders may use reels of filaments fed into a heated melting chamber which is attached to a nozzle. The rate of material extrusion from the nozzle can depend on the rate at which the filament is fed off the reels into the melting chamber. Additive manufacturing software may control the extrusion rate based on the desired diameter of extruded filaments and the speed at which the nozzle is moving.

Various systems can be used for performing the extrusion based additive manufacturing method according to the invention.

It will be appreciated that the print head trajectory and velocity and/or acceleration is also regarded as print parameters which can be controlled by the system/method.

The system and method may be employed for manufacturing a three-dimensional porous structure, wherein the porous structure is formed having interconnected pores.

It will be appreciated that the three-dimensional structure can have filaments spaced apart, or it can be a dense structure with fibers adjacent to each other. When the filaments are adjacent to each other, porosity can be provided by the filaments themselves. When the filaments are spaced from each other, porosity can be mainly provided by the pores formed between the filaments. The filaments themselves can also be porous, e.g. having smaller pores.

According to an aspect, the invention relates to a computer implemented method for printing a (porous) three-dimensional structure. The computer implemented method may be configured to operate an additive manufacturing system to perform the steps of the printing method according to the invention. Optionally, the computer implemented method includes the steps of: receiving a model of a (porous) object to be manufactured, selecting one or more of the plurality of printing stations for printing the (porous) object, and defining a print path depending on desired characteristics of the (porous) object, using the received model of the object to be manufactured. The received model may for instance be a 3D representation of the object to be printed.

Optionally, a material extrusion additive manufacturing process is employed in which a material is deposited continuously in a chosen arrangement.

It will be appreciated that the extruded filament may also be known in the art as a strut, fibre/fiber, rod, raster, extrudate, and other terms.

It will be appreciated that the term filament diameter may be understood as a characteristic length of a cross section of the filament being deposited. Other terms may also be used for this feature, such as for example, filament width, fiber diameter, filament size, strut width, etc. The filaments may have various cross section shapes.

It will be appreciated that the layer thickness can be seen as a layer height or slice thickness. It represents a z-increment when 3D printing the three-dimensional structure.

A wide range of materials can be used, with a vast range of properties. Examples are metals, composites, ceramics, polymers, natural materials, gels, etc. Different materials may result in different mechanical properties. Hence, the print path may depend on the specific material used during deposition.

Examples of materials that can be used in the extrusion based additive manufacturing process, include ceramic materials (e.g. alumina, zirconia, silica, silicon carbide, silicon nitride, etc.), composite materials (e.g. polymer ceramic composites), metals (RVS, titanium, copper, aluminum, silver, etc.) zeolites, metal organic frameworks, carbon, graphene etc. Other materials suitable for extrusion based additive manufacturing are also envisaged, such as for instance polymer based materials.

It will be appreciated that the porosity may represent a pore (volume) fraction. The pore width or pore size in the porous three-dimensional structure may define the porosity at a location or region of the porous structure.

Some embodiments may be implemented, for example, using a machine or tangible computer-readable medium or article which may store an instruction or a set of instructions that, if executed by a machine, may cause the machine to perform a method and/or operations in accordance with the embodiments.

It will be appreciated that any of the aspects, features and options described in view of the system apply equally to the method and the described device. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
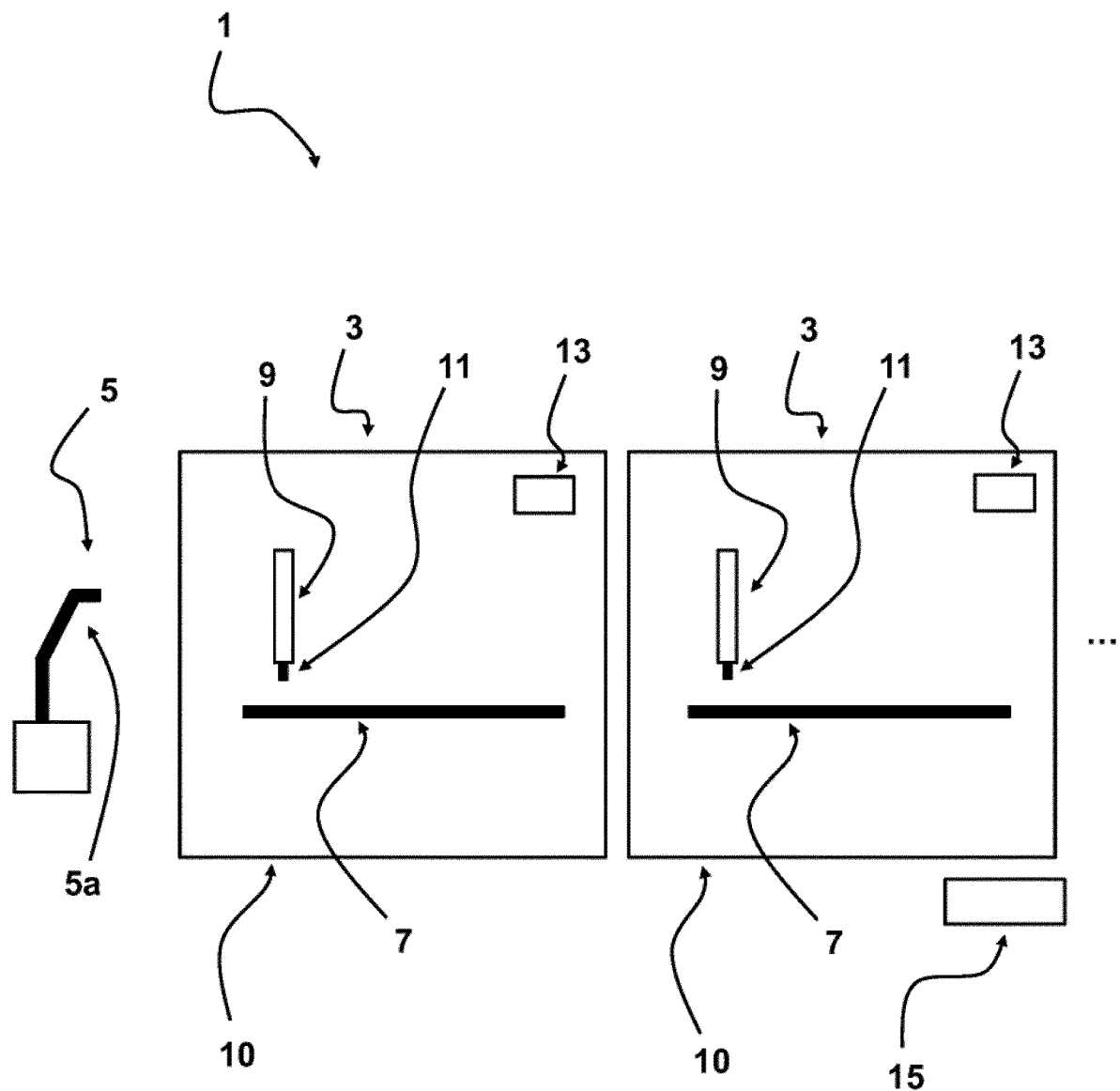
FIG. 1 shows a schematic diagram of an embodiment of a system.

FIG. 1 shows a schematic diagram of an embodiment of a system 1 arranged for manufacturing three-dimensional structures. The system 1 comprises a plurality of printing stations 3 and a robotic unit 5 configured to interact with the plurality of printing stations 3. Each of the plurality of printing stations 3 is arranged to be accessible by the robotic unit 5 (e.g. via a hatch, door, window or the like). Furthermore, each printing station 5 comprises a detachable carrier 7, a deposition unit 9 with at least one nozzle 11 arranged for dispensing filaments of a build material paste through an opening area thereof. Further, each printing station includes a station controller 13 configured to operate the deposition unit 9 for deposition of filaments of the build material paste on the detachable carrier 7 in an interconnected arrangement in a plurality of stacked layers in order to form one or more three-dimensional structures. The at least one nozzle 11 and the detachable carrier 7 are relatively moveable with respect to each other. The station controller 13 of each of the printing stations 3 is configured to control at least one deposition control parameter. The robotic unit 5 includes a handling device 5a for handling detachable carriers 7. The robotic unit 5 is configured for providing, removing and/or replacing detachable carriers 7 in the plurality of printing stations 3. The system further includes a system controller 15 configured to operate at least the robotic unit 5. Furthermore, the system controller 15 is communicatively coupled to the plurality of printing stations 3 for controlling at least an execution of printing tasks being performed on the plurality of printing stations 3.

In the shown example, each printing station has a printing station housing 10. The housing can be formed by walls, a frame, a cage or the like. Combinations of housing elements are also possible. Instead of employing individual housing 10 for each printing station, it is also possible to arrange a system housing (not shown). A combination of station housings and a system housing is also possible. The housing 10 may define one or more confined areas with restricted access (for example by humans) when a printing process is carried out, when the robotic unit 5 is performing actions, etc.

Figure 2:
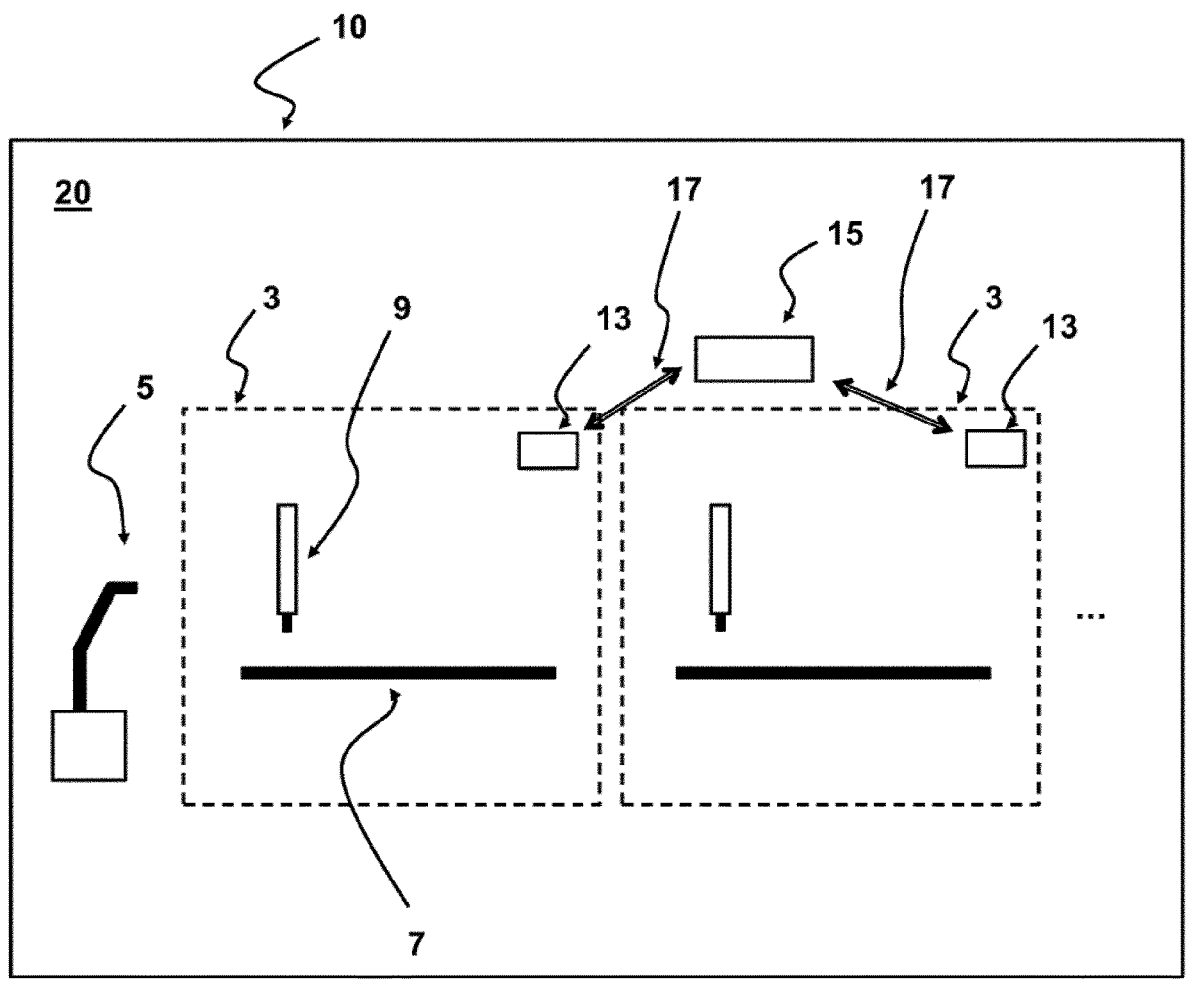
FIG. 2 shows a schematic diagram of an embodiment of a system.

FIG. 2 shows a schematic diagram of an embodiment of a system 1 similar to the embodiment shown in FIG. 1. In this example an overall system housing 10 is arranged defining a confined area 20 covering the plurality of printing stations 3 and a working space of the robotic unit 5 for interacting with the plurality of printing stations 3. The system controller 13 is communicatively coupled to the station controllers 13 of the plurality of printing stations 3 via communication interfaces 17.

Figure 3A:
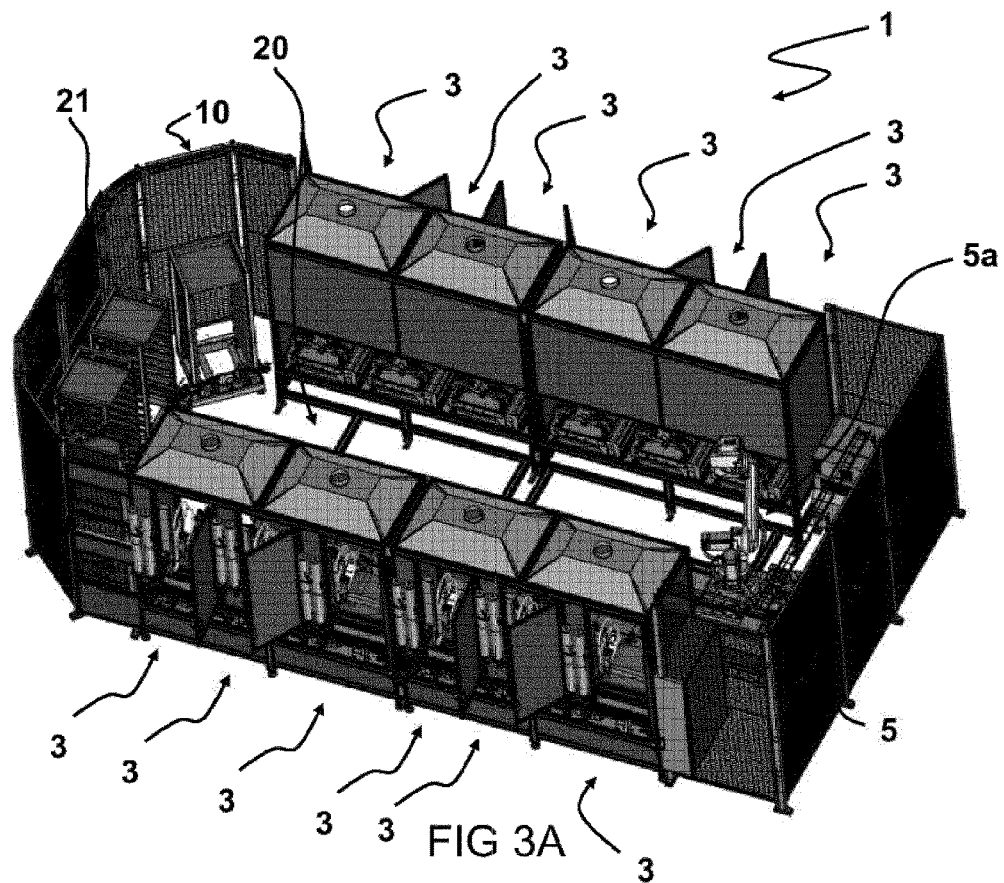
FIGS. 3a and 3b show a schematic diagram of an embodiment of a system.
Figure 3B:
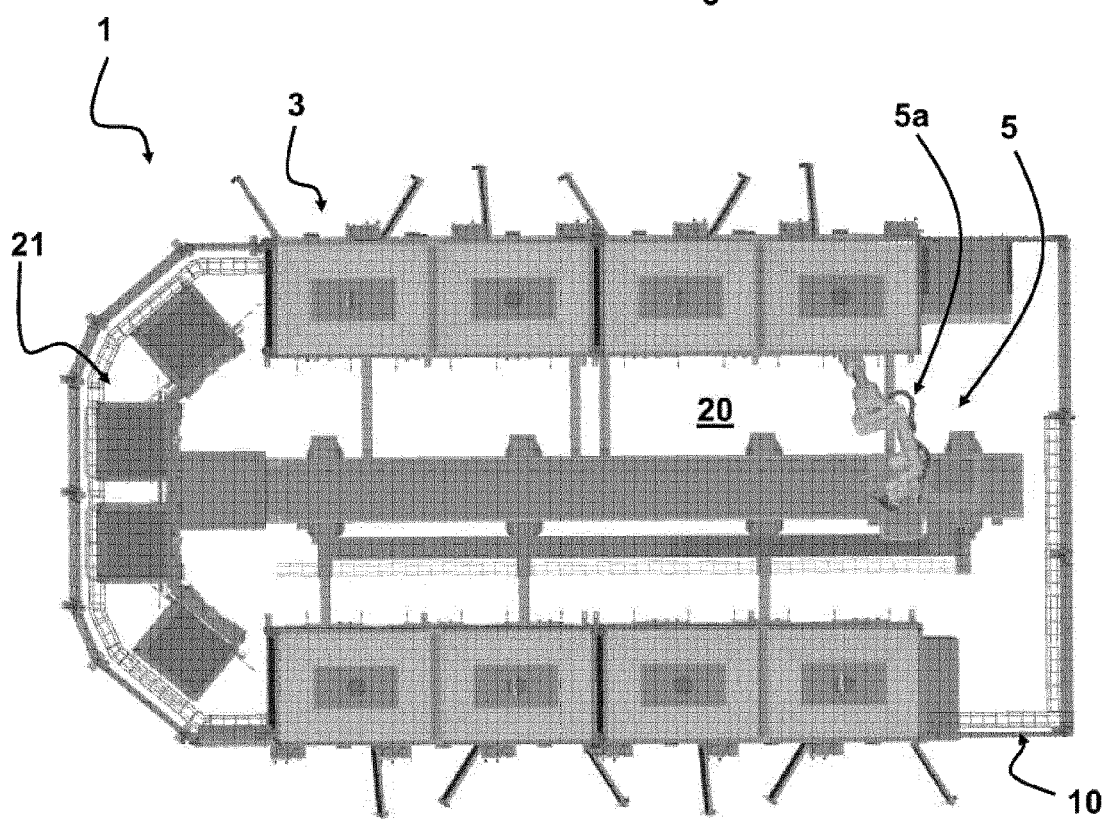

FIGS. 3a and 3b shows a schematic diagram of an embodiment of a system 1 respectively in a perspective view and a top view. The system 1 includes a plurality of printing stations 3 grouped together. In this shown example, twelve individual printing stations are integrated in the system 1. Furthermore, the system has a robotic unit 5 with a handling device 5a. The robotic unit 5 is operable in a confined area 20 defined by a system housing 10. The robotic unit 5 can be configured to transport detachable carriers 7 from and to a collection system 21. In this example, the collection system 21 includes a plurality of racks arranged for holding carriers 7.

In the shown example, six printers are arranged on either side of a rail of the robotic unit on which the handling device can move for accessing the plurality the printing stations 3. In this example, three printers are grouped in a housing. The housing has two extraction channels each. It will be appreciated that other arrangements are also envisaged.

Figure 4:
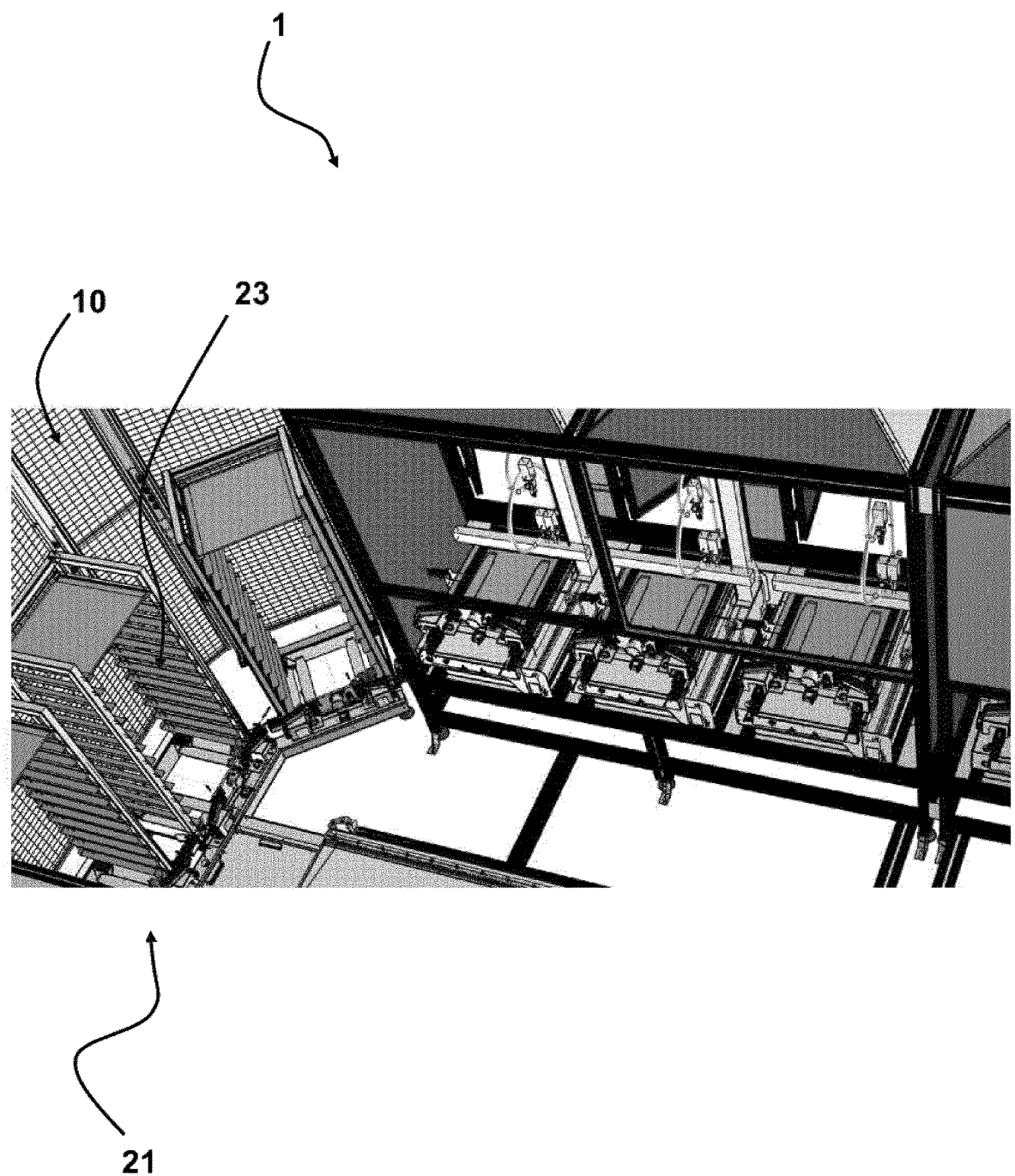
FIG. 4 shows a schematic diagram of an embodiment of a system.

FIG. 4 shows a schematic diagram of an embodiment of a system 1. A part of the system 1 as shown in FIG. 3 is illustrated in perspective view. In this example, the detachable carrier 7 are formed by trays which can be handled by the handling device 5a of the robotic unit 5. The collection system 21 includes a plurality of slots 23 in which the carriers 7 can be positioned. In this example, each printing station has a deposition unit 9 with two nozzles 11. However, a different number of nozzles can also be employed. It is also possible that the deposition unit 9 includes a deposition head with multiple nozzle opening arranged therein. It is also envisaged that the plurality of printing stations 3 have different deposition units 9, for example with a different number of nozzles 11.

Figure 5:
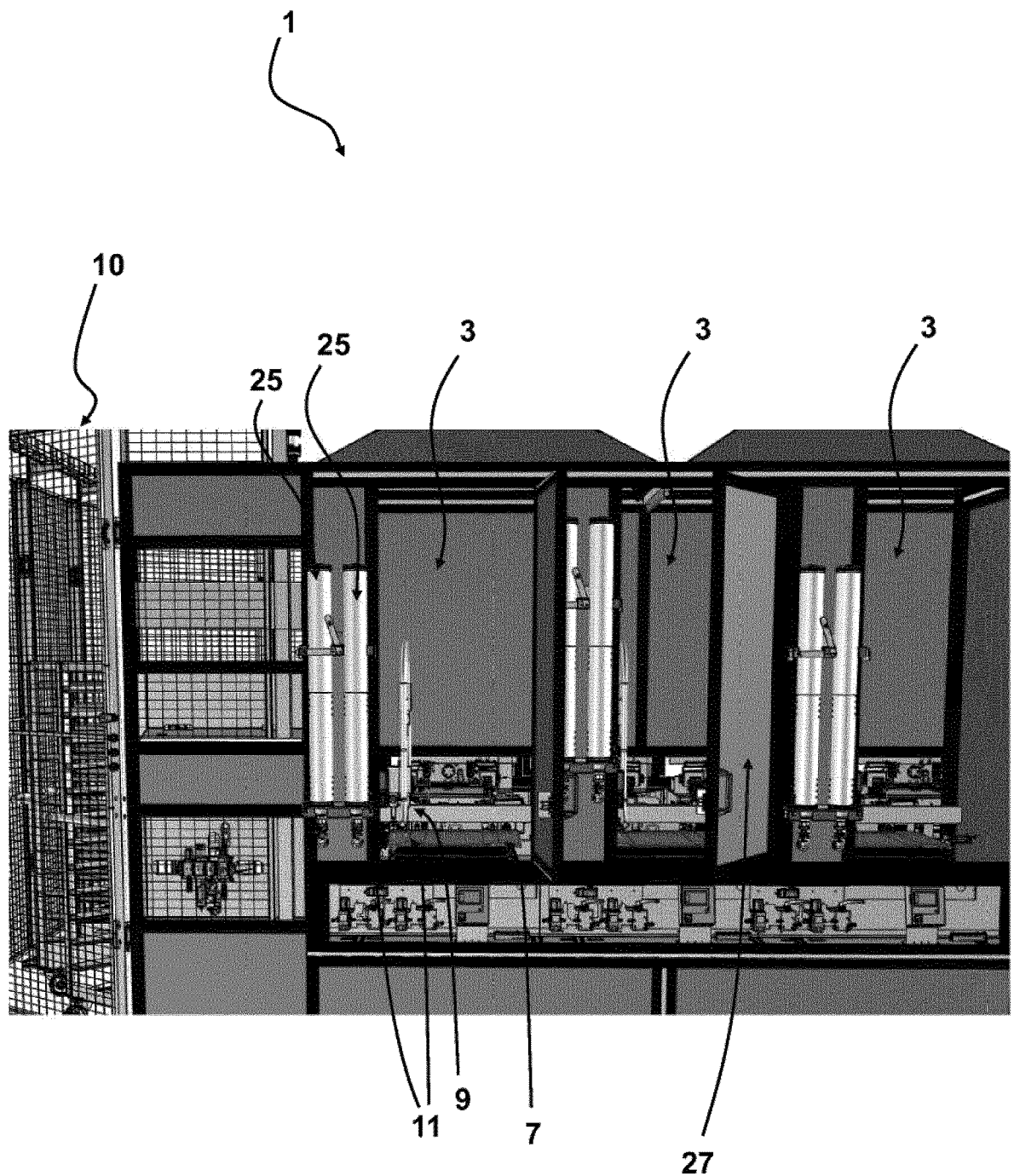
FIG. 5 shows a schematic diagram of an embodiment of a system.

FIG. 5 shows a schematic diagram of an embodiment of a system 1 in side view. In this example, the paste reservoirs 25 are placed external to the working space of the printing station 3 in which the three-dimensional structures are printed by filament deposition on the carrier 7. In this way, the paste reservoir 25 can be disconnected without requiring operations in the working space of the printing station 3. A more efficient, continuous and/or safer printing process can be obtained. The reservoirs 25 can be easily replaceable without requiring access to the deposition head 9. This provides important advantages compared to placing the reservoir 25 on or adjacent the deposition head 9 of the printing station 3. The reservoir 25 can be mounted on a remote location with respect to the deposition head 9. The build material paste (e.g. viscous paste) can be provided to the deposition head by means of tubing, or the like, providing a fluid communication between the reservoir 25 and the deposition head 9.

The reservoir 25 mounted externally can facilitate replacement thereof. The reservoir 25 can be better accessible for replacement, even during printing operations by the printing station 3. A replacement can be carried out while being protected from moving parts (e.g. at least one of a deposition unit and carrier of the printing station). The reservoir 25 for holding the build material paste can be arranged outside the confined environment in which the printing is performed by paste extrusion, the confined area being defined at least partially by the housing 10 and doors 27. The paste reservoir 25 can be easily accessible for replacement, refilling, etc. The printing process can be significantly enhanced in this way. The reservoir can have a tubing (e.g. hose) providing a fluid connection (for transport of the build material paste) between the nozzle of the deposition unit 9 and the paste reservoir 25.

A detection system can be set up which is configured to detect when a reservoir 25 needs to be replaced or replenished. Different types of detections are possible (e.g. optical detection, visual detection, etc.).

FIG. 6 shows a schematic diagram of a print path in an extrusion process for manufacturing a three-dimensional structure 1. The print path illustrates how the filaments of the three-dimensional structure are deposited on the plurality of layers. The system is arranged to deposit interconnected filaments in a predetermined arrangement in a plurality of stacked layers. The filaments of the consecutive layers can be connected to one another to obtain a porous structure with interconnected pores. Furthermore, filaments of the consecutive layers can be angled with respect to each other.

In an extrusion process, a nozzle 101 is scanned along a print bed 103 depositing filaments following the shown print path 105. It will be appreciated that it is also envisaged that the print bed 103 is moved instead of the nozzle 101 (kinematic inversion). A combination is also possible. In an alternative example, both the nozzle 101 and the print bed 103 can be moved during at least portions of the deposition process.

Figure 6A:
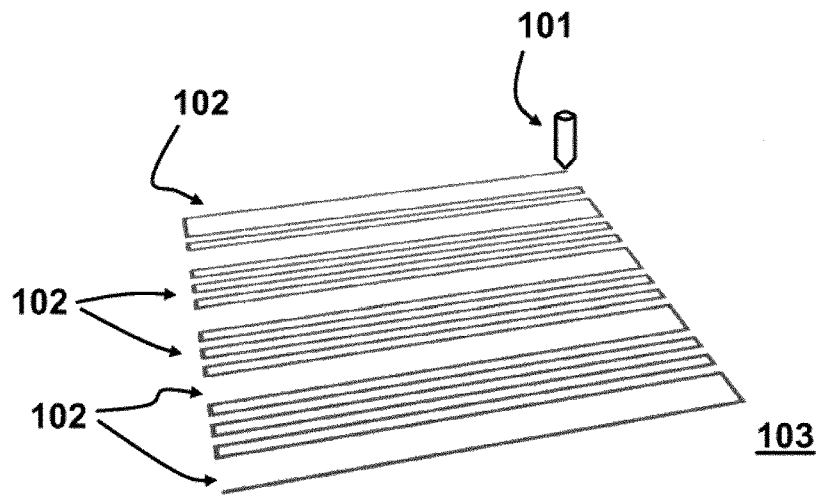
FIG. 6 shows a schematic diagram of a method for an extrusion process.
Figure 6B:
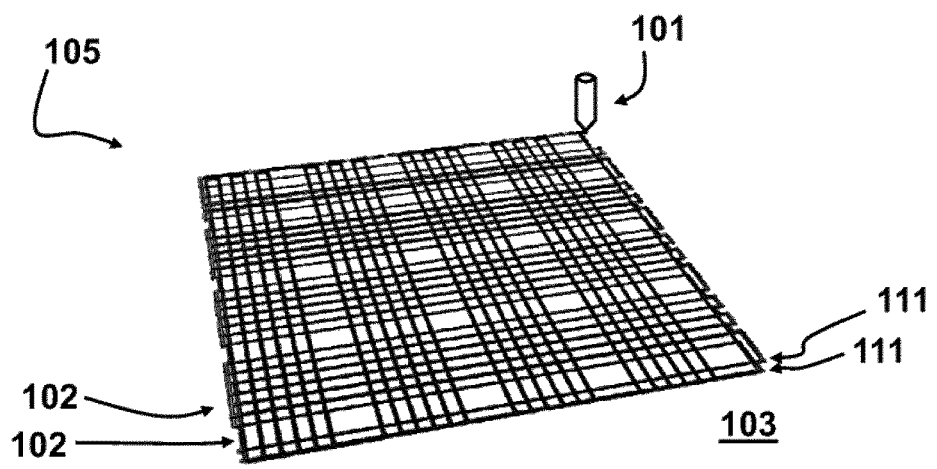
Figure 6C:
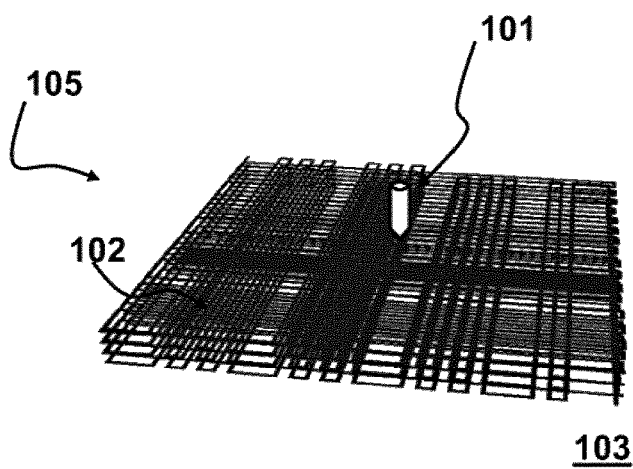

In FIG. 6a, the print path 105 for the first layer on the print bed 103 is shown. In FIG. 6b, the print path 105 of two layers are shown. In FIG. 6c, the print path 105 is shown in which the fourth layer is being deposited. It will be appreciated that large variety of print path arrangement are possible for obtaining the arrangement of the interconnected filaments of the three-dimensional structure.

By altering the deposition pattern, the local mechanical properties of the three-dimensional structure can be locally changed, so that a different heat treatment for drying and/or calcination may be required. In this example, the three-dimensional structure being printed has a non-homogeneous filament-to-filament distance (interspacing). Homogenous interspacing is also possible.

Although this example illustrates extrusion printing of a build material paste for forming a porous structure, it is also envisaged that the system can be employed for depositing non-porous three-dimensional structures, i.e. without pores between the filaments.

Figure 7A:
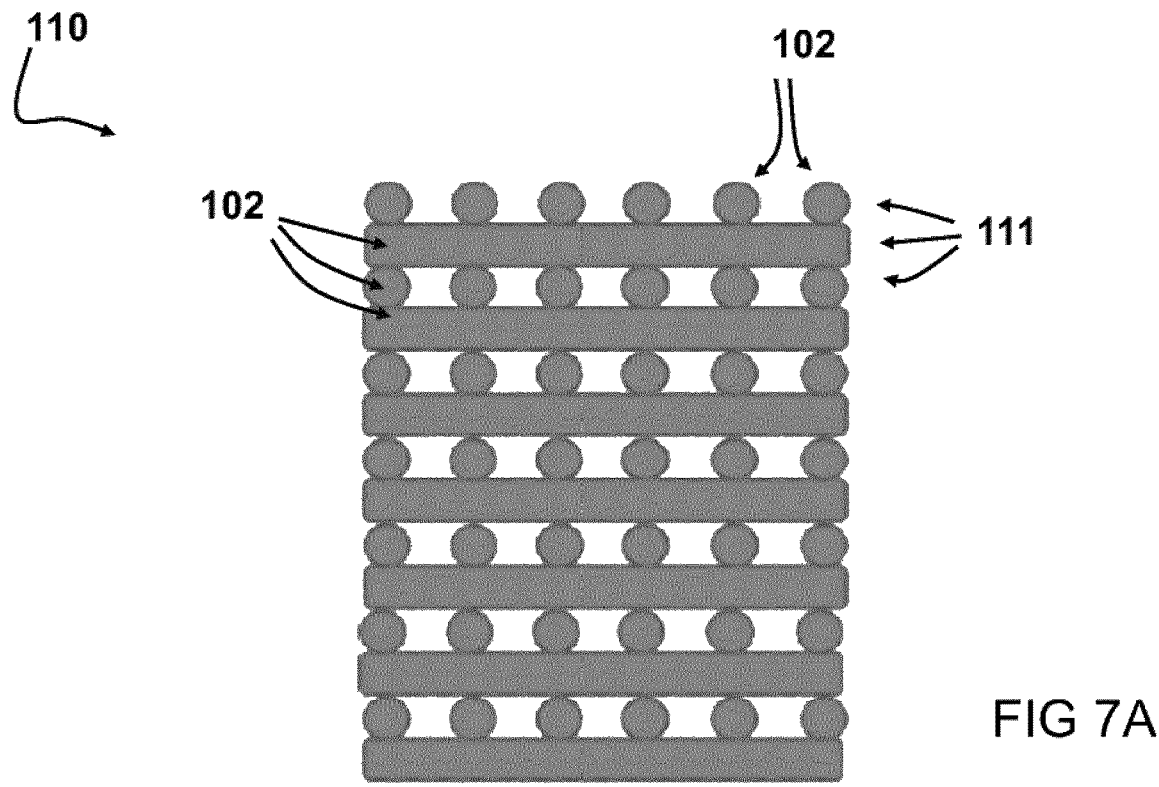
FIG. 7 shows a schematic diagram of a porous structure.
Figure 7B:
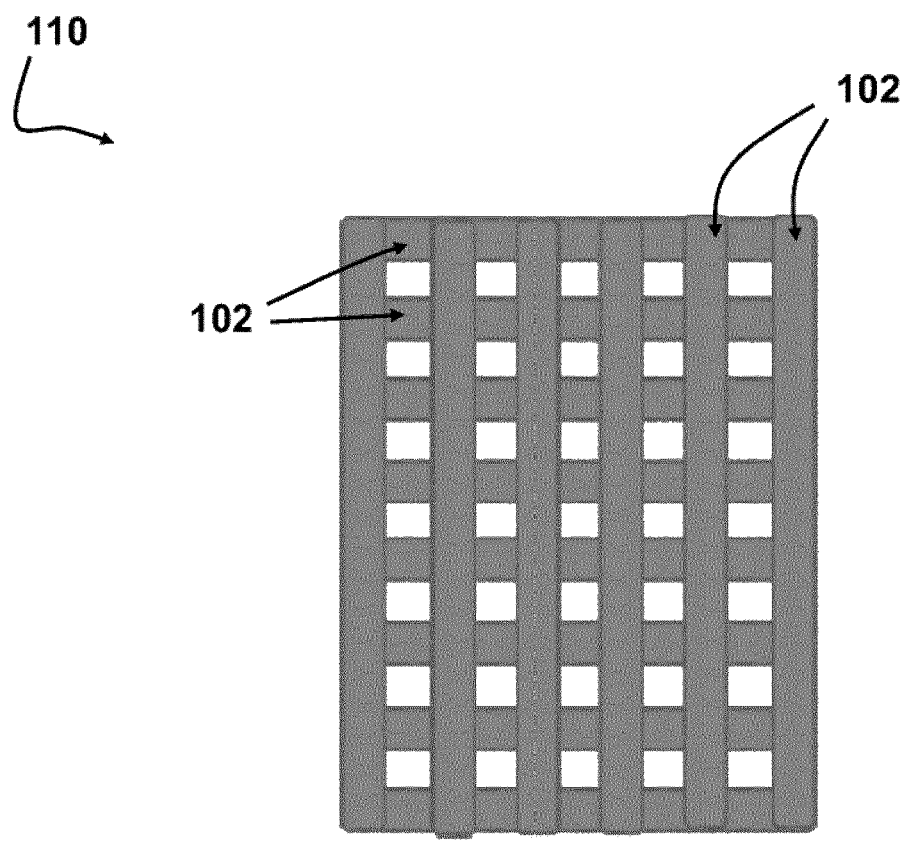

FIG. 7 shows a schematic diagram of an embodiment of a three-dimensional porous structure 110 obtained by depositing filaments 102 in a predetermined interconnected arrangement in a plurality of stacked layers 111 for forming a porous structure 110 with interconnected pores. In FIG. 7a, a cross sectional side view of the porous structure 110 is shown. In FIG. 7b, a cross sectional top view of the porous structure 110 is shown.

The porosity influences the stiffness or elastic modulus (cf. Young modulus), which is a measure of rate of change of stress over strain, defining how much a material deforms in response to a given force. Whether the filaments 102 are aligned or staggered also impacts the mechanical properties of the three-dimensional structure. For instance, a three-dimensional structure 110 with staggered filaments 102 may have a lower elastic modulus than a three-dimensional structure 110 with aligned filaments 102. For example, for a aligned filament arrangement (as shown in this example), there can be a solid column from top to bottom of the three-dimensional structure, which exists because the filaments 102 intersect at similar positions. This solid column can strongly resist compression. In contrast, for a staggered filament arrangement, the filaments 2 may bend slightly and stress can be concentrated at hinge points.

Furthermore, the filament orientation can also influence the mechanical properties of the three-dimensional structure. For instance, a three-dimensional structure with a 0/90, 0/60/120 and 0/45/90/135 filament orientation may have different elastic moduli. It will be appreciated that other lay-down patterns are also envisaged, such as for example triangular, rectangular, hexagon, curved, zigzag patterns. These lay-down patterns can also influence the pore size.

The three-dimensional (porous) structure can be produced layer-by-layer in various ways. Although the embodiments in the figures show flat layers wherein all filaments are extruded for a single layer (with the nozzle at a constant height above the print bed) before the nozzle moves up by the layer thickness to begin printing the next layer, it is also envisaged that curved layers are printed by changing the distance between the nozzle and the print bed during the deposition of a single filament. By moving the nozzle away and closer to the print bed during said deposition, a curved shape can be obtained.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for manufacturing three-dimensional structures, the system comprising a plurality of printing stations and a robotic unit configured to interact with the plurality of printing stations, each of the plurality of printing stations being arranged to be accessible by the robotic unit, and wherein each printing station comprises a detachable carrier, a deposition unit with at least one nozzle arranged for dispensing filaments of a build material paste through an opening area thereof, and a station controller configured to operate the deposition unit for deposition of filaments of the build material paste on the detachable carrier in an interconnected arrangement in a plurality of stacked layers in order to form one or more three-dimensional structures, the at least one nozzle and the detachable carrier being relatively moveable with respect to each other, wherein the station controller of each of the printing stations is configured to control at least one deposition control parameter, wherein the robotic unit includes a handling device for handling detachable carriers, wherein the robotic unit is configured for providing, removing and/or replacing detachable carriers in the plurality of printing stations, and wherein the system further includes a system controller configured to operate the robotic unit, and wherein the system controller is communicatively coupled to the plurality of printing stations for controlling at least an execution of printing tasks being performed on the plurality of printing stations, wherein the system controller is communicatively coupled to the station controllers of the plurality of printing stations, and wherein the station controllers are at least partially controllable by means of the system controller, wherein the system controller is configured to adjust at least one deposition control parameter of each printing station independent of deposition control parameters of other printing stations of the plurality of printing stations.

2. The system according to claim 1, wherein the deposition control parameters of each printing station is individually adapted for compensating printing deviations and/or deviations in build material paste properties.

3. The system according to claim 1, wherein the system controller is configured to determine an indication of viscosity difference of pastes employed in the different printing stations of the system, wherein the system controller is configured to adjust individual deposition control parameters of the printing stations based on said indication of viscosity difference.

4. The system according to claim 1, wherein different printing stations are provided for printing build material pastes of different compositions.

5. The system according to claim 1, wherein the at least one deposition control parameter is individually adjustable for each nozzle of the at least one nozzle of each printing station.

6. The system according to claim 1, wherein operations of the plurality of printing stations are independently controllable with respect to each other by means of the system controller.

7. The system according to claim 1, wherein a housing is arranged to enclose at least the deposition unit and the detachable carrier of each printing station.

8. The system according to claim 7, wherein the at least one deposition control parameter for each of the plurality of printing stations is adjustable by means of a respective terminal.

9. The system according to claim 1, wherein the at least one deposition control parameter for each of the plurality of printing stations is adjustable by means of a central terminal.

10. The system according to claim 1, wherein each printing station includes a detection unit configured to detect when a detachable carrier is to be provided, removed and/or replaced, wherein information of the detection unit is communicated to the system controller.

11. The system according to claim 1, wherein the at least one deposition control parameter includes at least one of: an actuation force or pressure for achieving deposition, a printing speed during relative movement between the deposition unit and the support during deposition of the filaments, a size of the opening area through which build material is discharged, or a temperature to which the build material is heated for deposition.

12. The system according to claim 1, wherein the nozzle head includes a plurality of nozzles for depositing filaments, the plurality of nozzles being spaced apart from each other.

13. The system according to claim 1, wherein the system further includes a positioning structure arranged for positioning the carrier within the printing station, wherein the positioning structure includes a first positioning member and a second positioning member, wherein the first positioning member and the second positioning member are arranged to cooperate to realize a positioning function of the carrier within the system.

14. The system according to claim 1, wherein the detachable carrier of each printing station is movable to a collection system by means of the robotic unit.

15. A method for manufacturing three-dimensional structures, the method including providing a plurality of printing stations and a robotic unit configured to interact with the plurality of printing stations, each of the plurality of printing stations being arranged to be accessible by the robotic unit, and wherein each printing station is provided with a detachable carrier, a deposition unit with at least one nozzle arranged for dispensing filaments of a build material paste through an opening area thereof, a housing arranged to enclose at least the deposition unit and the detachable carrier, and a station controller configured to operate the deposition unit for deposition of filaments of the build material paste on the detachable carrier in an interconnected arrangement in a plurality of stacked layers in order to form one or more three-dimensional structures, the at least one nozzle and the detachable carrier being relatively moveable with respect to each other, wherein the station controller of each of the printing stations is configured to control at least one deposition control parameter, wherein the robotic unit includes a handling device for handling detachable carriers, wherein the robotic unit is configured for providing, removing and/or replacing detachable carriers in the plurality of printing stations, and wherein a system controller is provided configured to operate the robotic unit, and wherein the system controller is communicatively coupled to the plurality of printing stations for controlling at least an execution of printing tasks being performed on the plurality of printing stations, wherein the system controller is communicatively coupled to the station controllers of the plurality of printing stations, and wherein the station controllers are at least partially controllable by means of the system controller, wherein the system controller is configured to adjust at least one deposition control parameter of each printing station independent of deposition control parameters of other printing stations of the plurality of printing stations.

16. A method for manufacturing three-dimensional structures, the method comprising dispensing filaments of build material paste through the at least one nozzle of the deposition unit of at least one of the plurality of printing stations of the system of claim 1, in order to form the three-dimensional structures.

* * * * *